United States Patent [19]

Stewart, Jr. et al.

[11] Patent Number: 4,956,763
[45] Date of Patent: Sep. 11, 1990

[54] PORTABLE SELF-CONTAINED SURGE LEVEL CONTROLLER

[75] Inventors: William B. Stewart, Jr., Houston; Henry K. Lau, Sugarland; Anthony M. Leonardi-Cattolica, Houston, all of Tex.

[73] Assignee: Shell Oil Company, Houston, Tex.

[21] Appl. No.: 226,171

[22] Filed: Jul. 29, 1988

[51] Int. Cl.$^5$ .................. F17D 3/01; F01N 23/00
[52] U.S. Cl. .................. 364/154; 137/386; 137/395; 364/500
[58] Field of Search .............. 364/148, 149, 150, 151, 364/152, 153, 157, 500, , 501, 509, 510; 137/395, 393, 389, 386; 250/357.1

[56] References Cited

U.S. PATENT DOCUMENTS

| | | | |
|---|---|---|---|
| 4,358,682 | 11/1989 | Telfer et al. | 250/357.1 |
| 4,386,623 | 6/1989 | Funk et al. | 364/153 |

Primary Examiner—Jerry Smith
Assistant Examiner—Jim Trammell

[57] ABSTRACT

A portable self-contained surge level controller detects the liquid level in a vessel, such as by neutron backscatter, and adjusts inlet or outlet flow to compensate for incoming surges while minimizing outgoing flow disturbances.

20 Claims, 3 Drawing Sheets

PORTABLE SELF-CONTAINED SURGE LEVEL CONTROLLER

BACKGROUND OF THE INVENTION

A very common problem encountered in many industries, such as the petrochemical industry, is compensating for disturbances in the flow rate of liquid materials coming into a particular processing unit. Such disturbances are usually common and ordinary events in the routine operation of the process, for example in an olefin plant.

One of the most common and important disturbances which occurs in an olefin plant is a change in the plant feed rate. For instance, furnaces are frequently brought off-line for decoking and then brought on-line again. The plant feed disturbance caused by bringing down or starting up a furnace enters the pyrofractionator whose top products go through compression and fractionation (demethanizer, deethanizer, ethylene splitter, depropranizer, and debutanizer), creating temperature and composition control problems for the cold side fractionation of the olefin plant. Ultimately, smooth operation of a plant may be hindered. Disturbances are commonly transmitted from the point of origin through the plant by means of changes in the forward flow. The less sudden these changes, and the more the magnitude of these disturbances can be minimized, the better will be the plant controllability. Most of these processes can be adjusted to accommodate these variations with little loss in efficiency, providing the surge is not too great and sufficient time is available to adjust the process.

One strategy has been to include one or more surge tanks in the liquid flow lines or to utilize certain volume capacity ranges within existing vessels to provide temporary capacity for smoothing out the surges. The liquid levels in these vessels, e.g., surge tanks, bottoms of fractionation columns and accumulators, and so forth, may then be allowed to vary within limits so that the outlet flow changes from these vessels are significantly smaller than the instantaneous inlet flow changes. Each liquid level thus acts as a buffer for the downstream units. Thus, this surge capacity, which may be receiving flow from a number of different units, by allowing the level in the surge tank to deviate from its setpoint while staying within allowable limits, attenuates the effects of any feed flow disturbance so that the disturbances do not propagate quite as strongly and the operation of the process is much steadier.

A good surge volume control algorithm should have several important characteristics. The level in the vessel should not exceed the high and low limits to ensure that the vessel will not overflow or empty. In the absence of any disturbance over a long period of time, the level should line out at the target level. The available surge volume should be utilized effectively to minimize the effect of a feed rate change on the downstream process. The method should be relatively simple so that it can be easily maintained. Also, tuning the controller should not be difficult and should not require much effort.

This is not a new problem, and sophisticated and complicated control programs for entire refining plants exist, usually requiring a very large computer installation for implementation. Rigorous solutions of this problem, for example, typically require a quadratic programming technique. What is needed is a less complicated but robust and equally effective method and apparatus for surge volume control which can be readily and economically utilized and implemented in smaller surge control applications. Ideally, the method and apparatus could be implemented in a portable, microprocessor-based controller, thereby affording the greatest economy and versatility.

SUMMARY OF THE INVENTION

Briefly, the present invention meets the above needs and purposes with a surge control system and method which simultaneously accomplish four objectives. Firstly, when an inlet flow disturbance occurs, the outlet flow is manipulated smoothly to dissipate the mass imbalance over a period of time whose length depends on the surge capacity of the vessel. Secondly, the level is permitted to deviate from its setpoint during this period but it is kept within limits. Thirdly, the level, over a period of time, is returned to its setpoint. Fourthly, the level, in the absence of further large inlet flow disturbances, remains close to the setpoint.

To understand the implementation, level control operations can be divided into essentially three distinct modes. During periods in which very small upsets in the feed flow rate may enter a unit, the level in a surge vessel is allowed to drift somewhat but ultimately should line out at the setpoint. Very small outlet flow changes are therefore made during this normal period. During periods in which a large upset occurs in the unit, however, for example when the plant feed changes due to a furnace tripping in an olefins plant, the surge volume in the vessel is used to filter this large disturbance and slow down its movement from the upstream section of the unit to the downstream section. In this mode of operation, the surge or reservoir capacity of the vessel is exploited by the volume control system to make the smallest possible outlet flow changes during each time interval such that the outlet flow rate will match the new inlet flow by the time the surge capacity of the vessel is exhausted. This dissipates the mass imbalance introduced by the upset as smoothly as possible. Finally, instances may arise when the level in the surge vessel has exceeded a high or low limit. In that case, the priority is to turn the level around and bring it back quickly within the limits, even though this may create an undesirably large excursion in the outlet flow rate.

The present invention readily handles all three modes, and moves easily between the modes as needed. Furthermore, the present invention is implemented in an uncomplicated, microprocessor-based portable configuration which can easily be implemented even on smaller process units having only a few loops which require this type of advanced control. In the present invention, the level of the fluid in the surge vessel is determined continuously using a neutron backscatter level detector which is easily attachable to the vessel for detecting the fluid level therein. The detector has a plurality of spaced neutron sources and suitable means for converting the detected count rates to a substantially continuous indication of the detected fluid level. This information is then passed to an appropriately programmed microprocessor which calculates three different outlet flow changes depending upon the current state of the level and the rate of change of level in the vessel. The microprocessor then implements the flow change via a proportional-integral flow controller which sends an appropriate output signal to a flow valve.

During the normal state, the move is given by a discrete optimal proportional-integral controller. The only tuning constant is the time period over which it is preferred that the level returns to the setpoint if there has been an offset or a slight mass imbalance. During the upset state, a set of equal moves or flow rate changes over a period of time is calculated and specified so that the level in the vessel arrives at its maximum or minimum limit when the mass imbalance (i.e., the differential in mass flow rate between the inlet and the outlet of the surge vessel) is dissipated, the outlet flow thereby following a ramp response from initial to final states. In the most extreme case, where the level has exceeded one of those limits, the microprocessor determines and specifies a move which is also based on a discrete optimal proportional-integral algorithm, but this time with the limit as the target level, with the tuning being such that the level can be turned around if it has stayed out of limit for two or more consecutive control executions. These three moves are derived based on least squares minimization theory and are optimal in the least squares sense. The logic which selects the move which is to be implemented is based on the current state of the level and the relative signs and sizes of the three moves.

It is therefore an object of the present invention to provide a new and improved portable surge level control method and apparatus; such a method and apparatus which can be used for controlling the inlet or outlet flow of a fluid-containing in-line vessel having a surge or reservoir capacity; which includes a neutron backscatter level detector attachable to the vessel for detecting the fluid level therein; in which the neutron backscatter level detector includes a plurality of spaced neutron sources (which could also be a continuously distributed source) and means for converting the detected count rates to a substantially continuous indication of the detected fluid level; which also includes computational means such as a microprocessor which is connected to the level detector and also connectable to regulate the flow to and/or from the vessel in response to the detected fluid level; in which the computational means regulates the flow by estimating the instantaneous mass imbalance and predicting the resultant volume in the vessel, calculates a normal control move in response to the estimated instantaneous mass imbalance and predicted resultant volume, calculates an out-of-limit control move with the volume high limit or low limit as a target when it has been determined that the predicted resultant volume exceeds that limit, calculates an upset move based upon the vessel's surge capacity and the estimated mass imbalance when it is predicted that the resultant volume will not exceed the vessel limits but that there is an instantaneous mass imbalance greater than a threshold amount, and compares the signs and magnitudes of the calculated moves to select the move to be implemented; which thereby generates control moves which regulate the vessel's fluid flow to smoothly converge the fluid level in the vessel toward a predetermined volume target or setpoint and protect against exceeding the capacity of the vessel; and to accomplish the above objects and purposes in an inexpensive, uncomplicated, durable, versatile, and reliable method and apparatus, inexpensive to manufacture and implement, and readily suited to the widest possible utilization in portable surge or reservoir capacity and surge level control systems.

These and other objects and advantages of the invention will be apparent from the following description, the accompanying drawings, and the appended claims.

DESCRIPTION OF THE PREFERRED EMBODIMENTS

Figure 1:
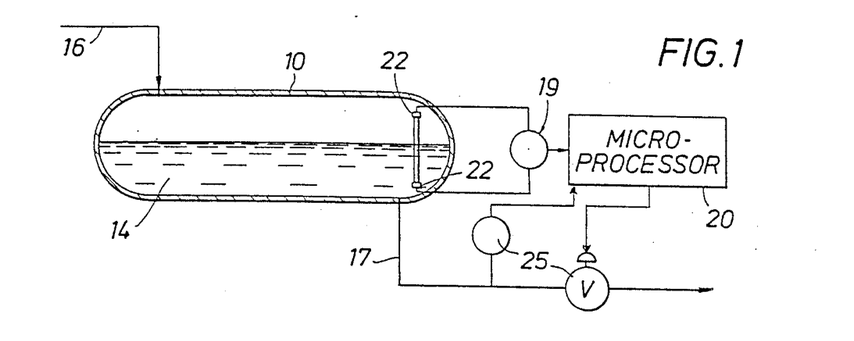
FIG. 1 is a highly figurative, schematic illustration showing a surge tank under the control of a surge level control system according to the present invention.

With reference to the drawings, the new and improved surge level control system for controlling the flow in a fluid-containing in-line vessel having a surge or reservoir capacity, and the method therefor according to the present invention, will be described. FIG. 1 shows a vessel 10 in which a liquid 14 is being received through an inlet pipe 16 and discharged through an outlet pipe 17. A neutron backscatter level detector system 19, which is attachable to vessel 10 for detecting the level of the liquid or fluid 14 therein, provides a substantially continuous indication of the detected fluid level to a microprocessor 20. The neutron backscatter level detector system 19, which contains at least two spaced neutron sources (or a continuously distributed source) 22, is described in greater detail in copending U.S. patent application Ser. No. 203,977, filed 6/8/88 entitled "Wide-Range Fluid Level Detector" (Leonardi-Cattolica, McMillan and Telfer), the entire subject matter of which is expressly incorporated herein by reference. Using the data from the level detector system 19, the microprocessor 20 then generates control commands or moves, according to the preferred embodiment of the present invention, for the outlet flow controller 25 in the outlet pipe 17. (Of course, components shown separately for clarity of illustration may be combined as desired, such as, for example, the microprocessor 20 and the flow controller 25.)

Figure 2A:
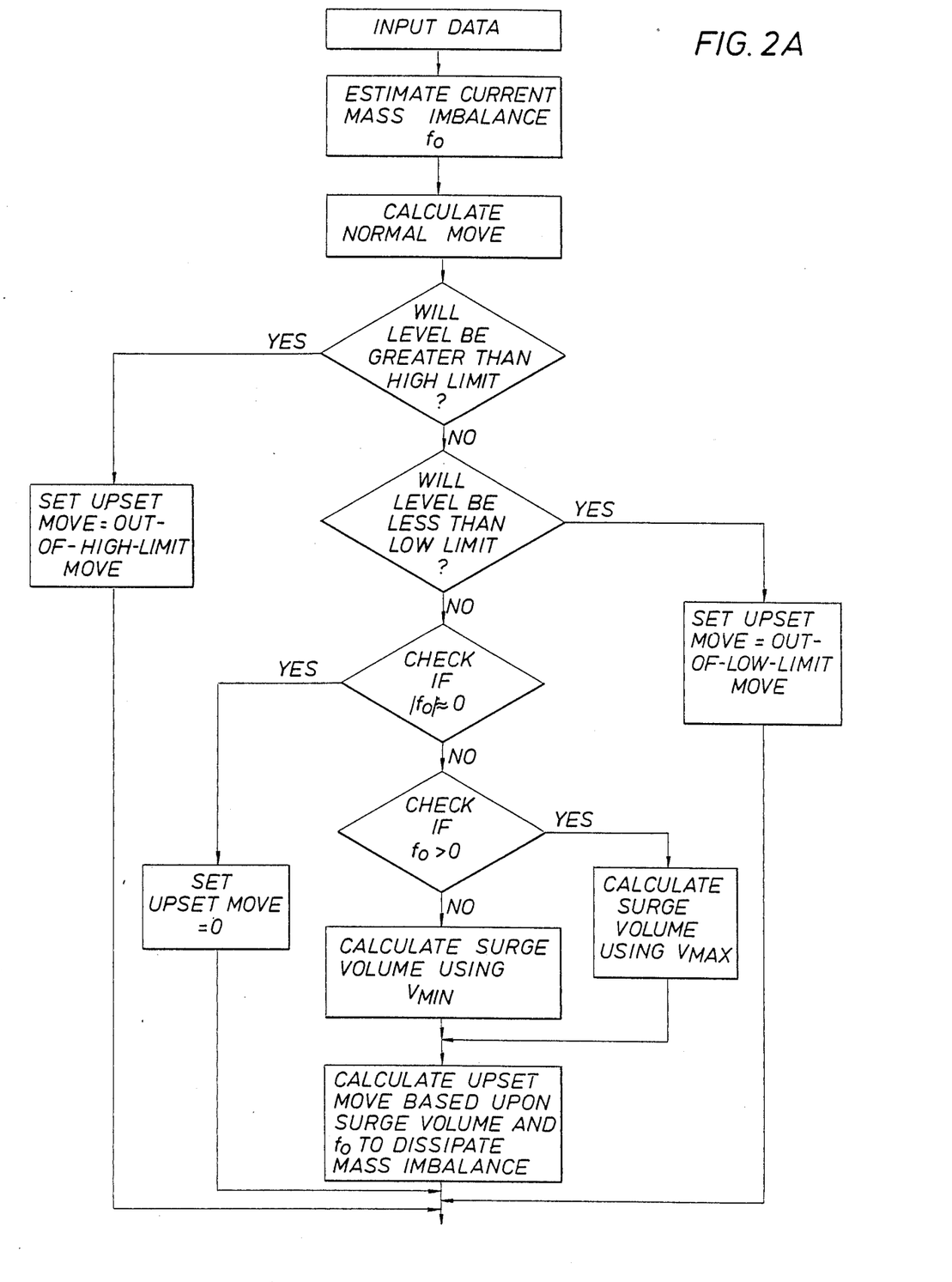
FIGS. 2A and 2B are a flow chart showing the procedure for determining the moves or outlet flow adjustments which are made for the surge or in-line vessel illustrated in FIG. 1, FIG. 2B being a continuation of the procedure illustrated in FIG. 2A.
Figure 2B:
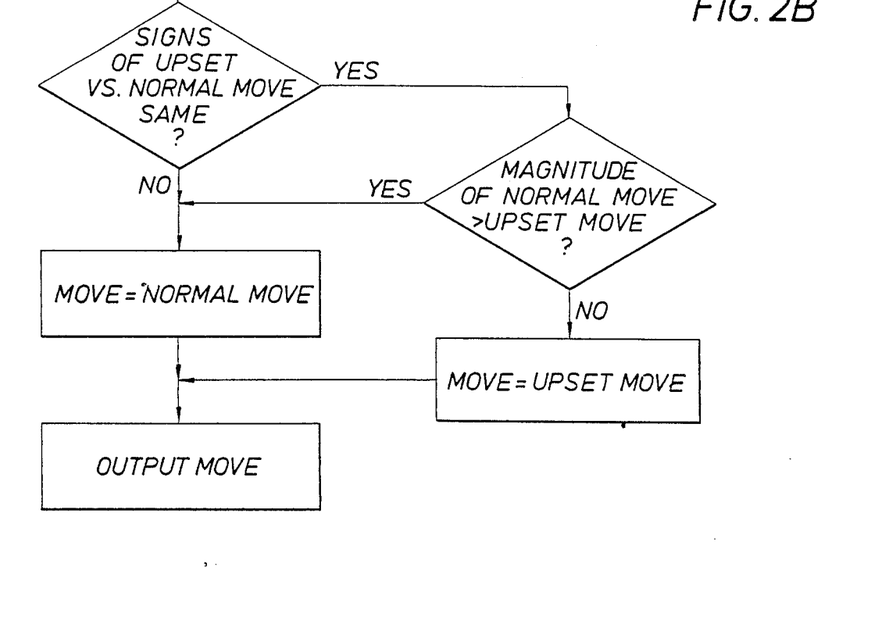

Referring to FIGS. 2A and 2B, the microprocessor 20 determines the changes or moves which the outlet flow controller or valve system 25 should make by determining the conditions at hand and then operating in one of three corresponding modes, referred to herein as a Normal Move, an Upset Move, and an Out-of-Limit Move.

NORMAL MOVE

During normal operation, the surge volume controller should keep the level in the buffer vessel 10 near the desired steady-state level, or "setpoint". However, the level in the tank should be permitted drift somewhat before ultimately lining out at the setpoint target level, allowing any outlet flow changes to be as small as possible. These technical requirements can be stated mathematically as:

$$\text{Minimize}_{\Delta f_i} \sum_{i=1}^{N} (\Delta f_i)^2 \tag{1}$$

$$\text{Subject to } f_o = \sum_{i=1}^{N} \Delta f_i$$

$$V_N = V_{sp} = V_o + Nf_o\Delta t - \sum_{i=1}^{N} (N - i + 1)\Delta f_i \Delta t \tag{2}$$

$$\text{where } f_o = (V_o - V_{prev})/\Delta t \tag{3}$$

$\Delta f_i$ = outlet flow change at the ith time interval based on the current mass imbalance and level
$V_o$ = volume at current time interval
$V_{prev}$ = volume at previous time interval
$V_{sp}$ = volume at setpoint level
$V_N$ = volume at the end of Nth time interval
$\Delta t$ = time interval between control executions
$f_o$ = estimated current mass imbalance
$N$ = tuning parameter specifying a time horizon at which the volume is at setpoint and the mass imbalance is zero. $N \geq 2$.

The analytical solution to this minimization problem is:

$$\Delta f_{N-i+1} = \tag{4}$$

$$\frac{2(N-1)(3i-N-1)f_o\Delta t + 6\Delta V_{sp}(N+1-2i)}{N(N-1)(N+1)\Delta t}$$

$$i = 1, \ldots, N$$

$$\text{where } \Delta V_{sp} = V_{sp} - V_o$$

In an on-line application, only the move at the first time interval is implemented and the mass imbalance $f_o$ and volume difference $\Delta V_{sp}$ are recalculated at each control execution. For $i=N$ $$\Delta f_1 = \frac{2(2N-1)}{N(N+1)} f_o - \frac{6\Delta V_{sp}}{N(N+1)\Delta t} \tag{5}$$

From the definition of $f_o$ and $\Delta V_{sp}$ one can then define the Normal Move as:

$$\Delta f_1 = \frac{2(2N-1)(V_o - V_{prev}) - 6(V_{sp} - V_o)}{N(N+1)\Delta t} \tag{6}$$

This is the discrete velocity form of the proportional-integral controller. Given a time horizon N, this is the optimal controller in the least squares sense. If N is large, surge volume control results. The level is allowed to drift before returning to the setpoint and the outlet flow changes gradually. If N is small, tight level control results and the outlet flow changes quickly in response to a mass imbalance and offset.

The mode described above does not handle constraints. To ensure that the tank does not overflow or empty, the volume must be kept within limits. The upset move does that.

UPSET MOVE

When a large mass imbalance occurs the surge volume control system must keep the volume within the allowable limits (between $V_{Max}$ and $V_{Min}$) as well as dissipate the mass imbalance. The normal move does not consider the constraints on the volume of the vessel. Consequently, it does not try to keep the level within limits. The upset move uses the surge capacity optimally to dissipate any mass imbalance in the vessel. The upset move is given by the solution to the following minimization problem:

$$\text{Minimize} \sum_{i=1}^{NLIM} (\Delta f_i)^2$$

$$\text{Subject to } f_o = \sum_{i=1}^{NLIM} \Delta f_i \tag{7}$$

where $V_{LIM}$ is given by $\begin{array}{l} V_{LIM} = V_{MAX} \text{ if } f_o > 0 \\ V_{LIM} = V_{MIN} \text{ otherwise} \end{array}$ and NLIM is given by $$V_{LIM} = V_o + NLIM \cdot f_o \Delta t - \sum_{i=1}^{NLIM} (NLIM - i + 1)\Delta f_i \Delta t \tag{8}$$

Solving this minimization problem by assuming NLIM to be some constant yields a "ramp" change in the outlet flow, $$\Delta f_i = \frac{f_o}{NLIM} \tag{9}$$

Combining equations (8) and (9) allows the Upset Move to be defined as:

$$\Delta f_1 = \Delta f_i = \frac{f_o^2 \Delta t}{2\Delta V_{LIM} + f_o\Delta t} \tag{10}$$

where $\Delta V_{LIM} = V_{LIM} - V_o$

A comparison of the normal and upset moves is made (see FIG. 2B) to decide which move should be implemented. If the signs of the two moves are opposite the normal move is selected because it always drives the level in the proper direction. Without this comparison of signs an upset move might be implemented when it was not necessary. When the signs are the same the move which has the larger magnitude is implemented because, if the upset move is larger, the normal move cannot keep the level within limits.

OUT-OF-LIMIT MOVE

The upset move from equation (10) does not deal with the situation where the level has already exceeded the high or low limit. In such a situation, the first priority is to turn the level around quickly and bring it within the limit in a few control moves. The least squares normal move with two minor modifications can do this. In the integral term of equation (6) the $V_{sp}$ is replaced by $V_{LIM}$. In addition, the tuning needs to be very tight to obtain fast response. Consequently, the Out-of-Limit move is defined as:

$$\Delta f_1 = \frac{2(2N_{oL} - 1)(V_o - V_{prev}) - 6(V_{LIM} - V_o)}{N_{oL}(N_{oL} + 1)\Delta t} \quad (11)$$

When a large mass imbalance occurs which may move the level further from the violated limit, it is desirable to return the level quickly inside the limit without introducing a large mass imbalance in the opposite direction. It can be shown that with $N_{oL}$ equal to four the level will turn toward the limit in two control executions. $N_{oL}$ can be greater than four, but should not be less. With $N_{oL}$ less than four too large a mass imbalance may be introduced which may cause the level to go to the opposite limit. A good analogy to the way the constraints are handled is that it provides least squares satisfaction of limits weighted appropriately.

The calculations of all three types of moves require volume as an input. The advantage to using volume in place of level is that the control system becomes independent of vessel geometry. This is particularly important in the case of a horizontal cylindrical vessel. The level control problem for a horizontal cylindrical vessel is nonlinear whereas the equivalent volume control problem is linear. It is therefore preferred to include a routine in microprocessor 20 which converts a level reading from the level detector 19 to a volume, given the vessel geometry. Preferably, for a portable system, this routine will support two types of tank geometry: vertical cylindrical and horizontal cylindrical vessels.

Advantageously, the present invention can be extended to handle vessels in series. In that case, the future projections of the outlet flow moves from the upstream vessel are simply included in the calculations of the moves of the downstream vessel. This method may be useful for a series of vessels which experience large upset but have small capacities.

Referring again to the flowchart in FIGS. 2A and 2B, the first step is to estimate the current mass imbalance using equation (3). The next step is to calculate the normal move by equation (5). If the projected fluid level is within the maximum ($V_{MAX}$) and minimum ($V_{MIN}$) limits and the mass imbalance $f_o$ is less than a given amount (e.g., $<10^{-10}$), the microprocessor 20 returns the normal move as the move to be implemented. If a limit has been exceeded, the out-of-limit move is calculated. Otherwise, the upset move is calculated. After these moves are calculated, the sign of either the out-of-limit or upset move is compared to the sign of the normal move. If the signs are opposite, the normal move is implemented. If the signs are the same, then the magnitudes of the moves are compared and the move with the larger magnitude is implemented.

The calculations of the upset and normal moves require the estimation of a mass imbalance. In some vessels the level signals may be very noisy. The noise can be of such a frequency that the instantaneous estimated mass imbalance changes significantly over one time period while the longer time trend of the level remains relatively unperturbed. This phenomenon can cause larger than necessary moves to be made. To reduce this effect a nonlinear filter whose tuning is based on statistical properties of the level may be used. This filter is given by $$\hat{f}_t = f_t \cdot \text{Min}\left(\left|\frac{f_t}{2\alpha}\right|, 1\right) \quad (12)$$

where
$\hat{f}_t$ = filtered estimate of mass imbalance at time t
$f_t = (v_t - v_{t-1})/\Delta t$
$v_t$ = volume in the vessel at time t
$\Delta t$ = time period between control actions, in units of t
$\alpha$ = standard deviation of the noise in $f_t$ which is estimated a priori.

This nonlinear filter will reduce the magnitude of those mass imbalances which arise due to noise and pass through the larger mass imbalances which should not be filtered. Consequently, unnecessary outlet flow changes are not made.

Figure 3:
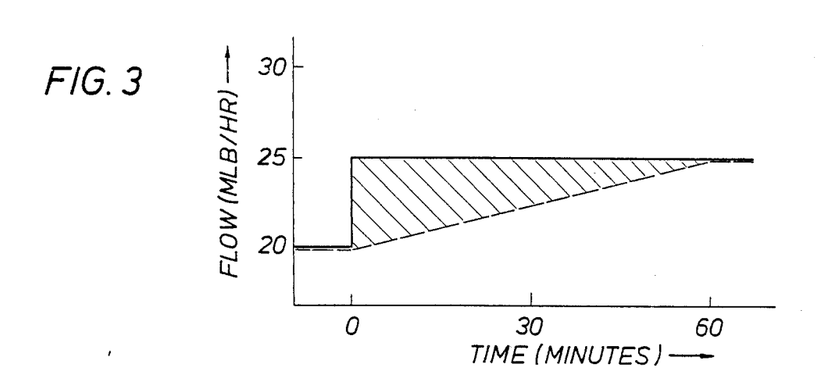
FIG. 3 is a graphical illustration showing the efficient utilization of the surge capacity of a vessel by the present invention in the upset level control mode.
Figure 4:
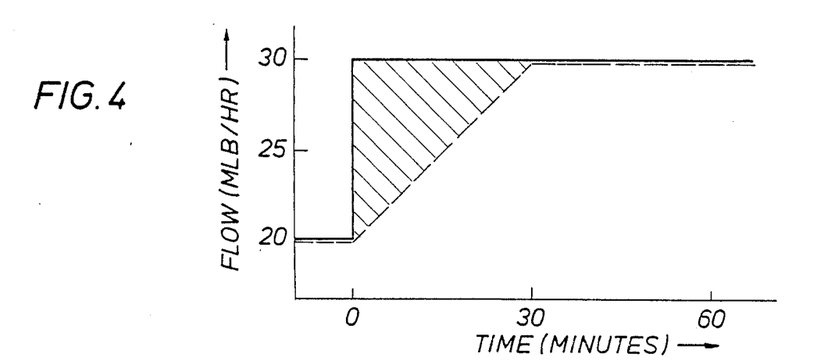
FIG. 4 is an illustration similar to FIG. 3 showing the response when the upset in the inlet flow rate is twice that shown in FIG. 3.

Referring now to FIGS. 3 and 4, operation in the upset mode will be described. The objective of upset level control is to use the surge capacity of the vessel 10 to dampen severe feed rate changes. This is accomplished by changing the flow leaving the vessel along a straight line over time in order to balance the level at the high or low limit. That is, the flow in the outlet pipe 17 is targeted to match (catch up with) that in the inlet pipe 16 just as the vessel level reaches its high or low limit. This objective is shown graphically in FIGS. 3 and 4. The surge in FIG. 4 is twice that of FIG. 3, requiring the outlet flow rate to be adjusted twice as fast.

More specifically, for these examples it is assumed that the flow of liquid entering the vessel 10 goes through an uncontrollable step change (e.g., furnace trip), and that the microprocessor 20 controls the flow leaving vessel 10 along some straight line whose slope must be calculated. The area of the shaded triangle represents the amount of material which accumulates in the vessel following the change in feed rate. For the practical level control problem, the area of this triangle is known to be the difference in volume between the high/low limit and the present level.

The base of the triangle represents the length of time taken to balance the flow rates (i.e., stabilize the fluid level in the vessel 10). Since the height and area of the triangle are known, the base (time) can be calculated, along with the corresponding slope of the flow change line. This calculated slope represents the slowest rate of change of flow which keeps the fluid level within its limits. If the rate of change of flow is slower, the limit is exceeded. If the rate of change of flow is faster, then the feed change is not being dampened as much as it could be. Analytically, it can be shown that the calculated minimum slope is proportional to the square of the current material imbalance. This shows that immediate action toward reduction of material imbalance is very important in order to effectively use the available surge volume.

The upset level control described above with respect to FIGS. 3 and 4 is best suited for situations in which feed flow changes are unpredictable. In some cases, however, the projected future flow from each of the feed sources may be known. This information then enables the microprocessor to predict the material balance into the future and to make flow moves accordingly.

Figure 5:
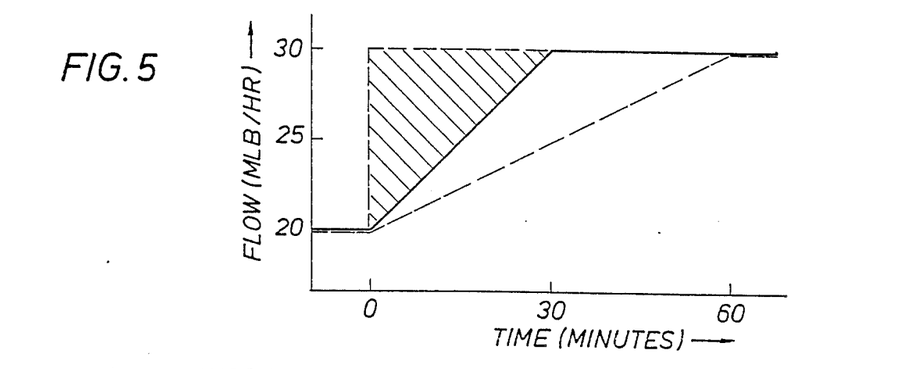
FIG. 5 is an illustration similar to FIGS. 3 and 4 showing the response of two surge vessels of equal capacity connected in series as they attenuate the effects of a large surge of the magnitude illustrated in FIG. 4.

FIG. 5 shows a graphical representation of upset control for two vessels in series. It is very similar to FIGS. 3 and 4. For illustrative purposes, all liquid from the first vessel is assumed to be recovered as liquid in the second. The initial and final flows leaving the second vessel are the same as those for the first. However, the rate of accumulation of material in the second is less than that of the first because the feed rate to the second changes along a straight line over time, rather than in a single step. The difference between accumulation in the first and second vessels is represented by the area of the shaded triangle. The height and base of this triangle are the first vessel's material imbalance and time to balance its level, respectively. These values for the first vessel are both known.

Figure 6:
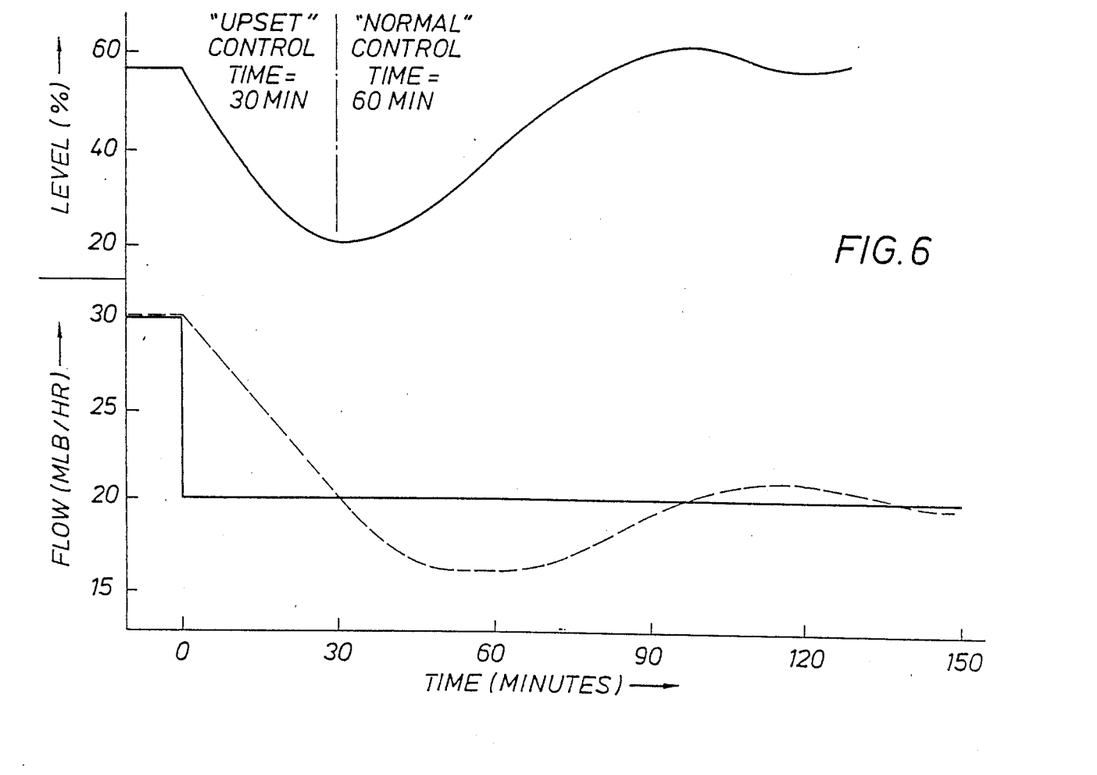
FIG. 6 illustrates the operation of the present invention in several modes, showing the response to a severe surge in which the initial control moves are determined by the upset control mode, and a smooth transition is then effected to the normal control mode, eventually returning the vessel to its setpoint.

Once the upset and/or out-of-limit modes have brought the fluid flows into material balance, the levels, which had been allowed to change, must be brought back to their targets within a reasonable period of time. This protects the unit from a second upset which may occur at any time. While the basic theory for "normal" level control is the same as that for "upset" level control, in practice there are some differences. In the "normal" case, the objective is to balance the vessel 10 at the target level at some time in the future. It does not matter if the target level is exceeded enroute to this final destination; the only constraint is that neither limit be exceeded. (See FIG. 6.) Thus, in the "normal" case, the user can select a length of time for the target conditions to be met. In the "upset" case, the time taken to balance the flow is fixed by the severity of the feed rate change and surge capacity of the vessel. The selected time frame depends upon the individual system. As the selected time decreases, the fluctuation of flow increases, with the level being held closer to target. As the time increases, the level is allowed to float more in order to reduce the fluctuation of flow moves.

As may be seen, therefore, the present invention has numerous advantages and provides a straightforward, economical, reliable, and highly versatile surge level control apparatus and method. Principally, it provides a robust and powerful, but uncomplicated, compact, and easily portable, surge level control system which can be readily utilized on an extremely wide range of level control applications. The traditionally complex methods for advanced process control, which have previously, due to their complexity, required implementation on large computers, have been overcome by the present invention. It is therefore not necessary to spread the cost of a major computational facility over many control loops and other functions. Instead, the present invention makes it possible to apply powerful control hardware even to process units having only a few loops which nevertheless require advanced control. Not only does the present invention operate quickly and reliably, making smooth transitions from one mode to the other as required, but it is also very easy for the user to adapt it to the particular application at hand. It is particularly easy to tune with only one tuning parameter: the time period over which the level should return to its setpoint whenever an offset or a mass imbalance occurs. $N_{oL}$ can also be a tuning parameter, as may be appropriate.

While discussed illustratively in connection with controlling the outlet flow of the vessel, it will be appreciated that the inlet flow could be controlled as well, depending upon the needs and conditions at hand. Therefore, when reference is made to controlling the flow in such a vessel, the meaning is that the inlet or outlet flow is controlled, as desired.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. For controlling the flow in a fluid-containing in-line vessel having a surge or reservoir capacity, a surge level control system, comprising:
   (a) a neutron backscatter level detector having detectable count rates attachable to such a vessel for detecting the fluid level therein, and having at least two spaced neutron sources and means for converting the detected count rates to a substantially continuous indication of the detected fluid level; and
   (b) computational means connected to said level detector and connectable to regulate the flow in such a vessel in response to the detected fluid level by:
      (i) estimating an instantaneous mass imbalance and predicting the resultant volume in the vessel;
      (ii) in a predetermined manner, calculating a normal control move in response to said estimated instantaneous mass imbalance and predicted resultant volume;
      (iii) determining whether said predicted resultant volume exceeds one of a predetermined volume high limit and a predetermined volume low limit of the vessel, and, when the high limit, then calculating an out-of-limit control move with substantially said volume high limit as a target, and, when the low limit, then calculating an out-of-limit control move with substantially said volume low limit as a target;
      (iv) at least when the instantaneous mass imbalance differs from zero by a predetermined amount, and when it is determined by said step of determining whether said predicted resultant volume exceeds one of said vessel limits that neither limit will be exceeded, then calculating an upset move based upon a predetermined relationship of the vessel's surge capacity and said estimated mass imbalance; and
      (v) comparing the signs and magnitudes of said calculated moves according to a predetermined relationship to select the move to be implemented;
   thereby generating control moves to regulate the fluid flow in the vessel to smoothly converge the fluid level in the vessel toward a predetermined volume target or setpoint and protect against exceeding the capacity of the vessel.

2. The apparatus of claim 1 wherein said computational means further comprises means for calculating said normal move based upon minimization of a sum of the squares of the flow changes.

3. The apparatus of claim 2 wherein said computational means further comprises means for calculating said normal move using the relationship:

$$\Delta f_1 = \frac{2(2N - 1)(V_o - V_{prev}) - 6(V_{sp} - V_o)}{N(N + 1)\Delta t}$$

where
$\Delta f_1$ = flow change in the next time interval based on the current mass imbalance and level N = tuning parameter specifying a time horizon at which the volume is at setpoint and the mass imbalance is zero N≧2
$V_o$ = volume at current time interval
$V_{prev}$ = volume at previous time interval
$V_{sp}$ = volume at setpoint level
$\Delta t$ = time interval between control executions.

4. The apparatus of claim 1 wherein said computational means further comprises means for calculating said upset move using the relationship:

$$\Delta f_1 = \frac{f_o^2 \Delta t}{2\Delta V_{LIM} + f_o \Delta t}$$

where
$\Delta f_1$ = flow change in the next time interval based on the current mass imbalance and level
$f_o$ = estimated current mass imbalance
$\Delta t$ = time interval between control executions
$\Delta V_{LIM} = V_{LIM} - V_o$
$V_{LIM}$ is given by:
  $V_{LIM} = V_{MAX}$ if $f_o > 0$
  $V_{LIM} = V_{MIN}$ otherwise
$V_{MAX}$ = maximum allowable volume in vessel
$V_{MIN}$ = minimum allowable volume in vessel
$V_o$ = volume at current time interval.

5. The apparatus of claim 1 wherein said computational means further comprises means for calculating said out-of-limit move using the relationship:

$$\Delta f_1 = \frac{2(2N_{oL} - 1)(V_o - V_{prev}) - 6(V_{LIM} - V_o)}{N_{oL}(N_{oL} + 1)\Delta t}$$

where
$\Delta f_1$ = flow change in the next time interval based on the current mass imbalance and level
$N_{oL}$ = tuning parameter for quickly returning the vessel volume inside the limit $N_{oL} \geq 4$
$V_o$ = volume at current time interval
$V_{prev}$ = volume at previous time interval
$V_{LIM}$ is given by:
  $V_{LIM} = V_{MAX}$ if $f_o > 0$
  $V_{LIM} = V_{MIN}$ otherwise
$f_o$ = estimated current mass imbalance
$\Delta t$ = time interval between control executions.

6. The apparatus of claim 1 further comprising a noise filter for generating a filtered estimate of the mass imbalance based upon a predetermined time trend of the fluid level when said estimated instantaneous mass imbalance exceeds a predetermined amount.

7. The apparatus of claim 6 wherein said noise filter further comprises means for generating said filtered estimate using the relationship:

$$\hat{f}_t = f_t \cdot \text{Min}\left(\left|\frac{f_t}{2\alpha}\right|, 1\right)$$

where
$\hat{f}_t$ = filtered estimate of mass imbalance at time t
$f_t = (v_t - v_{t-1})/\Delta t$
$v_t$ = volume in the vessel at time t
$\Delta t$ = time period between control actions, in units of t
$\alpha$ = standard deviation of the noise in $f_t$ which is estimated a priori.

8. The apparatus of claim 1 wherein said computational means for comparing and selecting the move to be implemented further comprises:
  (a) means for setting the upset move equal to the out-of-limit move when said predicted resultant volume exceeds one of said predetermined vessel volume limits; and
  (b) means for determining signs and magnitudes of the upset and normal moves; and
    (i) when the signs are different selecting the normal move;
    (ii) when the signs are the same and the magnitude of the normal move is greater than the upset move selecting the normal move; and
    (iii) when the signs are the same and the magnitude of the normal move is less than the upset move selecting the upset move.

9. The apparatus of claim 1 wherein said computational means is a microprocessor.

10. For controlling the outlet flow of a fluid-containing in-line vessel having a surge or reservoir capacity, a portable surge level control system suitable for implementation in a microprocessor-based controller, comprising:
  (a) a neutron backscatter level detector having detectable count rates attachable to such a vessel for detecting the fluid level therein, and having at least two spaced neutron sources and means for converting the detected count rates to a substantially continuous indication of the detected fluid level; and
  (b) microprocessor means connected to said level detector and connectable to regulate the outlet flow from such a vessel in response to the detected fluid level by:
    (i) estimating the instantaneous mass imbalance and predicting the resultant volume in the vessel;
    (ii) generating a filtered estimate of the mass imbalance based upon a predetermined time trend of the fluid level when said estimated instantaneous mass imbalance exceeds a predetermined amount, using the relationship:

$$\hat{f}_t = f_t \cdot \text{Min}\left(\left|\frac{f_t}{2\alpha}\right|, 1\right)$$

where
$\hat{f}_t$ = filtered estimate of mass imbalance at time t
$f_t = (v_t - v_{t-1})/\Delta t$
$v_t$ = volume in the vessel at time t
$\Delta t$ = time period between control actions, in units of t
$\alpha$ = standard deviation of the noise in $f_t$ which is estimated a priori
    (iii) based upon minimization of the sum of the squares of the outlet flow changes, calculating a normal control move in response to said estimated instantaneous mass imbalance and predicted resultant volume using the relationship:

$$\Delta f_1 = \frac{2(2N - 1)(V_o - V_{prev}) - 6(V_{sp} - V_o)}{N(N + 1)\Delta t}$$

where
$\Delta f_1$ = outlet flow change in the next time interval based on the current mass imbalance and level N = tuning parameter specifying a time horizon at which the volume is at setpoint and the mass imbalance is zero $N \geq 2$ $V_o$ = volume at current time interval $V_{prev}$ = volume at previous time interval $V_{sp}$ = volume at setpoint level $\Delta t$ = time interval between control executions (iv) determining whether said predicted resultant volume exceeds one of a predetermined volume high limit and a predetermined volume low limit of the vessel, and, when the high limit, then calculating an out-of-limit control move with substantially said volume high limit as a target, and, when the low limit, then calculating an out-of-limit control move with substantially said volume low limit as a target, both calculations being performed using the relationship:

$$\Delta f_1 = \frac{2(2N_{oL} - 1)(V_o - V_{prev}) - 6(V_{LIM} - V_o)}{N_{oL}(N_{oL} + 1)\Delta t}$$

where $\Delta f_1$ = outlet flow change in the next time interval based on the current mass imbalance and level $N_{oL}$ = tuning parameter for quickly returning the vessel volume inside the limit $N_{oL} \geq 4$ $V_o$ = volume at current time interval $V_{prev}$ = volume at previous time interval $V_{LIM}$ is given by:
 $V_{LIM} = V_{MAX}$ if $f_o > 0$
 $V_{LIM} = V_{MIN}$ otherwise $f_o$ = estimated current mass imbalance $\Delta t$ = time interval between control executions (v) at least when the instantaneous mass imbalance differs from zero by a predetermined amount, and when it is determined by said step of determining whether said predicted resultant volume exceeds one of said vessel limits that neither limit will be exceeded, then calculating an upset move based upon a predetermined relationship of the vessel's surge capacity and said estimated mass imbalance using the relationship:

$$\Delta f_1 = \frac{f_o^2 \Delta t}{2\Delta V_{LIM} + f_o \Delta t}$$

where $\Delta f_1$ = outlet flow change in the next time interval based on the current mass imbalance and level $f_o$ = estimated current mass imbalance $\Delta t$ = time interval between control executions $\Delta V_{LIM} = V_{LIM} - V_o$ $V_{LIM}$ is given by:
 $V_{LIM} = V_{MAX}$ if $f_o > 0$
 $V_{LIM} = V_{MIN}$ otherwise $V_{MAX}$ = maximum allowable volume in vessel $V_{MIN}$ = minimum allowable volume in vessel $V_o$ = volume at current time interval, and (vi) comparing signs and magnitudes of said calculated moves according to a predetermined relationship to select the move to be implemented, by:

(a) setting the upset move equal to the out-of-limit move when said predicted resultant volume exceeds one of said predetermined vessel volume limits; and (b) determining the signs and magnitudes of the upset and normal moves; and
 (i) when the signs are different selecting the normal move;
 (ii) when the signs are the same and the magnitude of the normal move is greater than the upset move selecting the normal move; and
 (iii) when the signs are the same and the magnitude of the normal move is less than the upset move selecting the upset move, thereby generating control moves to regulate the fluid flow from the vessel to smoothly converge the fluid level in the vessel toward a predetermined volume target or setpoint and protect against exceeding the capacity of the vessel.

11. A surge level control method for controlling the flow in a fluid-containing in-line vessel having a surge or reservoir capacity, comprising:

(a) detecting the fluid level in such a vessel with a neutron backscatter level detector having detectable count rates attachable to the vessel and having at least two spaced neutron sources and means for converting the detected count rates to a substantially continuous indication of the detected fluid level; and (b) regulating the flow in the vessel in response to the detected fluid level by:
 (i) estimating an instantaneous mass imbalance and predicting the resultant volume in the vessel;
 (ii) in a predetermined manner, calculating a normal control move in response to the estimated instantaneous mass imbalance and predicted resultant volume;
 (iii) determining whether the predicted resultant volume exceeds one of a predetermined volume high limit and a predetermined volume low limit of the vessel, and, when the high limit, then calculating an out-of-limit control move with substantially the volume high limit as a target, and, when the low limit, then calculating an out-of-limit control move with substantially the volume low limit as a target;
 (iv) at least when the instantaneous mass imbalance differs from zero by a predetermined amount, and when it is determined by the step of determining whether the predicted resultant volume exceeds one of the vessel limits that neither limit will be exceeded, then calculating an upset move based upon a predetermined relationship of the vessel's surge capacity and the estimated mass imbalance; and
 (v) comparing the signs and magnitudes of the calculated moves according to a predetermined relationship to select the move to be implemented, thereby generating control moves to regulate the fluid flow in the vessel to smoothly converge the fluid level in the vessel toward a predetermined volume target or setpoint and protect against exceeding the capacity of the vessel.

12. The method of claim 11 further comprising calculating the normal move based upon minimization of a sum of the squares of the flow changes.

13. The method of claim 12 further comprising calculating the normal move using the relationship:

$$\Delta f_1 = \frac{2(2N - 1)(V_o - V_{prev}) - 6(V_{sp} - V_o)}{N(N + 1)\Delta t}$$

where
- $\Delta f_1$ = flow change in the next time interval based on the current mass imbalance and level
- N = tuning parameter specifying a time horizon at which the volume is at setpoint and the mass imbalance is zero $N \geq 2$
- $V_o$ = volume at current time interval
- $V_{prev}$ = volume at previous time interval
- $V_{sp}$ = volume at setpoint level
- $\Delta t$ = time interval between control executions.

14. The method of claim 11 further comprising calculating the upset move using the relationship:

$$\Delta f_1 = \frac{f_o^2 \, \Delta t}{2\Delta V_{LIM} + f_o \Delta t}$$

where
- $\Delta f_1$ = flow change in the next time interval based on the current mass imbalance and level
- $f_o$ = estimated current mass imbalance
- $\Delta t$ = time interval between control executions
- $\Delta V_{LIM} = V_{LIM} - V_o$
- $V_{LIM}$ is given by:
  - $V_{LIM} = V_{MAX}$ if $f_o > 0$
  - $V_{LIM} = V_{MIN}$ otherwise
- $V_{MAX}$ = maximum allowable volume in vessel
- $V_{MIN}$ = minimum allowable volume in vessel
- $V_o$ = volume at current time interval.

15. The method of claim 11 further comprising calculating the out-of-limit move using the relationship:

$$\Delta f_1 = \frac{2(2N_{oL} - 1)(V_o - V_{prev}) - 6(V_{LIM} - V_o)}{N_{oL}(N_{oL} + 1)\Delta t}$$

where
- $\Delta f_1$ = flow change in the next time interval based on the current mass imbalance and level
- $N_{oL}$ = tuning parameter for quickly returning the vessel volume inside the limit $N_{oL} \geq 4$
- $V_o$ = volume at current time interval
- $V_{prev}$ = volume at previous time interval
- $V_{LIM}$ is given by:
  - $V_{LIM} = V_{MAX}$ if $f_o > 0$
  - $V_{LIM} = V_{MIN}$ otherwise
- $f_o$ = estimated current mass imbalance
- $\Delta t$ = time interval between control executions.

16. The method of claim 11 further comprising filtering noise by generating a filtered estimate of the mass imbalance based upon a predetermined time trend of the fluid level when the estimated instantaneous mass imbalance exceeds a predetermined amount.

17. The method of claim 16 wherein said step of filtering noise further comprises generating the filtered estimate using the relationship:

$$\hat{f}_t = f_t \cdot \text{Min}\left(\left|\frac{f_t}{2\alpha}\right|, 1\right)$$

where
- $\hat{f}_t$ = filtered estimate of mass imbalance at time t
- $f_t = (v_t - v_{t-1})/\Delta t$
- $v_t$ = volume in the vessel at time t
- $\Delta t$ = time period between control actions, in units of t
- $\alpha$ = standard deviation of the noise in $f_t$ which is estimated a priori.

18. The method of claim 11 wherein said step of comparing and selecting the move to be implemented further comprises:
(a) setting the upset move equal to the out-of-limit move when the predicted resultant volume exceeds one of the predetermined vessel volume limits; and
(b) determining signs and magnitudes of the upset and normal moves; and
  (i) when the signs are different selecting the normal move;
  (ii) when the signs are the same and the magnitude of the normal move is greater than the upset move selecting the normal move; and
  (iii) when the signs are the same and the magnitude of the normal move is less than the upset move selecting the upset move.

19. The method of claim 11 further comprising performing said steps with a microprocessor.

20. A surge level control method suitable for implementation in a portable microprocessor-based controller for controlling the outlet flow of a fluid-containing in-line vessel having a surge or reservoir capacity, comprising:
(a) detecting the fluid level in such a vessel with a neutron backscatter level detector having detectable count rates attachable to the vessel and having at least two spaced neutron sources and means for converting the detected count rates to a substantially continuous indication of the detected fluid level; and
(b) under control of a microprocessor means, regulating the outlet flow from the vessel in response to the detected fluid level by:
  (i) estimating instantaneous mass imbalance and predicting the resultant volume in the vessel;
  (ii) generating a filtered estimate of the mass imbalance based upon a predetermined time trend of the fluid level when the estimated instantaneous mass imbalance exceeds a predetermined amount, using the relationship:

$$\hat{f}_t = f_t \cdot \text{Min}\left(\left|\frac{f_t}{2\alpha}\right|, 1\right)$$

where
- $\hat{f}_t$ = filtered estimate of mass imbalance at time t
- $f_t = (v_t - v_{t-1})/\Delta t$
- $v_t$ = volume in the vessel at time t
- $\Delta t$ = time period between control actions, in units of t
- $\alpha$ = standard deviation of the noise in $f_t$ which is estimated a priori.
  (iii) based upon minimization of the sum of the squares of the outlet flow changes, calculating a normal control move in response to the estimated instantaneous mass imbalance and predicted resultant volume using the relationship:

$$\Delta f_1 = \frac{2(2N - 1)(V_o - V_{prev}) - 6(V_{sp} - V_o)}{N(N + 1)\Delta t}$$

where $\Delta f_1$ = outlet flow change in the next time interval based on the current mass imbalance and level N = tuning parameter specifying a time horizon at which the volume is at setpoint and the mass imbalance is zero $N \geq 2$ $V_o$ = volume at current time interval $V_{prev}$ = volume at previous time interval $V_{sp}$ = volume at setpoint level $\Delta t$ = time interval between control executions (iv) determining whether the predicted resultant volume exceeds one of a predetermined volume high limit and a predetermined volume low limit of the vessel, and, when the high limit, then calculating an out-of-limit control move with substantially the volume high limit as a target, and, when the low limit, then calculating an out-of-limit control move with substantially the volume low limit as a target, both calculations being performed using the relationship:

$$\Delta f_1 = \frac{2(2N_{oL} - 1)(V_o - V_{prev}) - 6(V_{LIM} - V_o)}{N_{oL}(N_{oL} + 1)\Delta t}$$

where $\Delta f_1$ = outlet flow change in the next time interval based on the current mass imbalance and level $N_{oL}$ = tuning parameter for quickly returning the vessel volume inside the limit $N_{oL} \geq 4$ $V_o$ = volume at current time interval $V_{prev}$ = volume at previous time interval $V_{LIM}$ is given by:
  $V_{LIM} = V_{MAX}$ if $f_o > 0$
  $V_{LIM} = V_{MIN}$ otherwise $f_o$ = estimated current mass imbalance $\Delta t$ = time interval between control executions (v) at least when the instantaneous mass imbalance differs from zero by a predetermined amount, and when it is determined by the step of determining whether the predicted resultant volume exceeds one of the vessel limits that neither limit will be exceeded, then calculating an upset move based upon a predetermined relationship of the vessel's surge capacity and the estimated mass imbalance using the relationship:

$$\Delta f_1 = \frac{f_o^2 \Delta t}{2\Delta V_{LIM} + f_o \Delta t}$$

where $\Delta f_1$ = outlet flow change in the next time interval based on the current mass imbalance and level $f_o$ = estimated current mass imbalance $\Delta t$ = time interval between control executions $\Delta V_{LIM} = V_{LIM} - V_o$ $V_{LIM}$ is given by:
  $V_{LIM} = V_{MAX}$ if $f_o > 0$
  $V_{LIM} = V_{MIN}$ otherwise $V_{MAX}$ = maximum allowable volume in vessel $V_{MIN}$ = minimum allowable volume in vessel $V_o$ = volume at current time interval, and (vi) comparing signs and magnitudes of the calculated moves according to a predetermined relationship to select the move to be implemented, by:
  (a) setting the upset move equal to the out-of-limit move when the predicted resultant volume exceeds one of the predetermined vessel volume limits; and
  (b) determining the signs and magnitudes of the upset and normal moves; and
    (i) when the signs are different selecting the normal move;
    (ii) when the signs are the same and the magnitude of the normal move is greater than the upset move selecting the normal move; and
    (iii) when the signs are the same and the magnitude of the normal move is less than the upset move selecting the upset move, thereby generating control moves to regulate the fluid flow from the vessel to smoothly converge the fluid level in the vessel toward a predetermined volume target or setpoint and protect against exceeding the capacity of the vessel.

* * * * *